United States Patent [19]

Schiel et al.

[11] Patent Number: 5,005,918
[45] Date of Patent: Apr. 9, 1991

[54] AUTOMOTIVE VEHICLE BRAKE SYSTEM

[75] Inventors: Lothar Schiel, Hofheim; Manfred Rueffer, Sulzbach, both of Fed. Rep. of Germany

[73] Assignee: Alfred Teves GmbH, Frankfurt, Fed. Rep. of Germany

[21] Appl. No.: 423,315

[22] Filed: Oct. 18, 1989

[30] Foreign Application Priority Data

Oct. 28, 1988 [DE] Fed. Rep. of Germany ....... 3836710

[51] Int. Cl.$^5$ ................................................ B60T 8/44
[52] U.S. Cl. ...................................... 303/114; 303/119
[58] Field of Search .................... 303/94, 97, 100, 110, 303/114, 118, 119

[56] References Cited

U.S. PATENT DOCUMENTS

| 4,512,615 | 4/1985 | Kita et al. | 303/114 X |
| 4,659,153 | 4/1987 | Klein | 303/114 |
| 4,828,337 | 5/1989 | Wagner et al. | 303/114 |
| 4,856,852 | 8/1989 | Ocvirk et al. | 303/114 |

FOREIGN PATENT DOCUMENTS 3508319  9/1986  Fed. Rep. of Germany .
3641105  6/1988  Fed. Rep. of Germany .

*Primary Examiner*—Duane A. Reger
*Attorney, Agent, or Firm*—Robert P. Seitter; J. Gordon Lewis

[57] ABSTRACT

In a slip-controlled automotive vehicle brake system, to reduce the number of the valves used, while simplifying the system construction, the wheel brake cylinders are connected to relief chambers (123, 133, 124, 134) of compensating cylinders (120, 130), the connection between the master-brake-cylinder pressure chambers (80, 90) and the relief chambers (123, 124, 133, 134) being closable during slip control.

6 Claims, 3 Drawing Sheets

AUTOMOTIVE VEHICLE BRAKE SYSTEM

BACKGROUND OF THE INVENTION

The present invention relates to an automotive vehicle brake system having a vacuum brake power booster which is interposed between brake pedal and master brake cylinder and which comprises at least two working chambers isolated from one another by a diaphragm plate, one chamber communicating with the vacuum source, while the other one is ventilated by means of a control valve actuatable by the brake pedal for generating a booster force that is proportional to the brake pedal force.

A brake system of this type is disclosed in German patent application No. P 38 14 222.8 (corresponding to the copending U.S. patent application of W. Wagner et al filed on Apr. 12, 1989 as Ser. No. 07/336,948 in which wheel brake cylinders are connected by way of brake lines to the master brake cylinder. In this system, sensors are allocated to the wheels to be braked which sense the rotational behavior of the wheels in order to determine wheel-lock, and the output signals of which sensors are delivered to a central control electronics. The control signals of the central control serve to control electromagnetically actuatable pressure-fluid inlet and outlet valves inserted into the brake lines for slip control. A second diaphragm plate is provided in the vacuum brake power booster to which a controllable pressure difference is applied and which isolates two additional pneumatic working chambers from each other and which, during slip control, is movable in a direction opposite to the actuating direction of the master brake cylinder under the effect of two compensating cylinders allocated to the master-brake-cylinder pressure chambers.

For generating in the slip control case a holdback force counteracting the brake pedal force, according to the noted German application, there is provision for a hydraulic chamber which is in operative connection with a force-output member of the vacuum brake power booster. The connection of the chamber with an unpressurized pressure-fluid supply reservoir is closable by way of a seat valve that preferably is actuatable electromagnetically. Relief pistons are slidably guided in each compensating cylinder, which confine relief chambers connectable to the master-brake-cylinder pressure chambers, and abut on the second diaphragm plate. The connections between the master-brake-cylinder pressure chambers and the relief chambers are closable by means of compensating valves which, preferably, are designed as solenoid valves closed in their de-energized state.

A significant disadvantage of these systems is the comparatively large number of valves which results in a potential source of trouble, and these systems are complicated and hence costly in construction. Therefore, it is an object of the present invention to improve upon such slip-controlled automotive vehicle brake systems such that the number of valves is reduced, while the system construction is simplified.

SUMMARY OF THE INVENTION

This object is achieved by the instant invention in that the wheel brake cylinders are connected to relief chambers of the compensating cylinders, the connection between the master-brake-cylinder pressure chambers and the relief chambers being closable in the slip control case. These measures accomplish a considerable increase of the reliability in operation of the proposed automotive vehicle brake system as well as a major reduction of its manufacturing and assembling costs.

BRIEF DESCRIPTION OF THE DRAWING

Further features, advantages and applications of the present invention can be gathered from the following description of an embodiment with reference to the accompanying drawing wherein.

DETAILED DESCRIPTION

Figure 1:
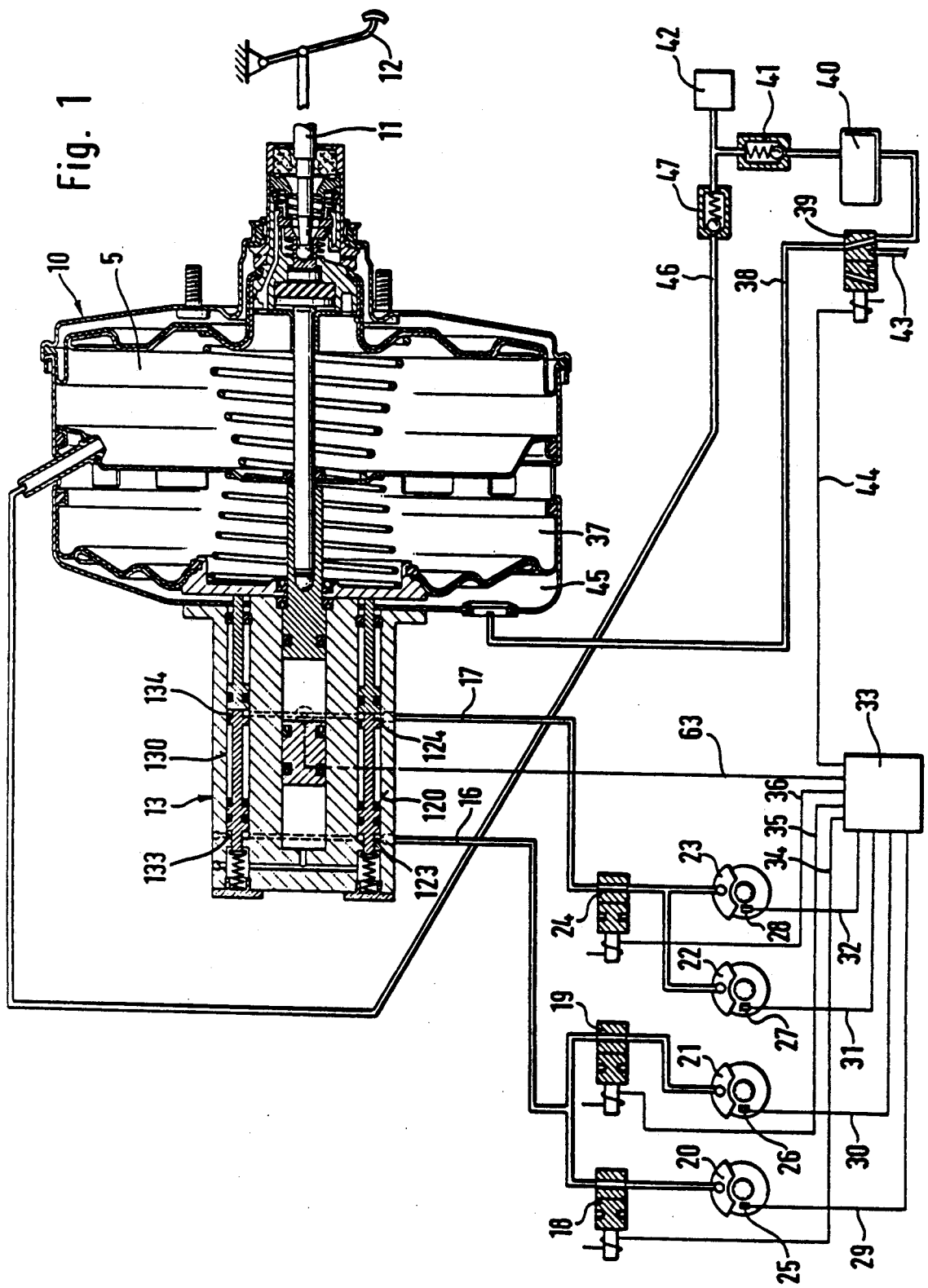
FIG. 1 is a schematic illustration of an automotive vehicle brake system according to the present invention.

In the various Figures of the drawing, like elements have been assigned like reference numerals. FIG. 1 shows an automotive vehicle brake system comprising a vacuum brake power booster 10 which is coupled to a brake pedal 12 by way of a piston rod 11 in a known manner. On the side of the vacuum brake power booster 10 remote from the piston rod 11, there is provision for a tandem master brake cylinder 13 which is in communication with a brake-fluid reservoir (not shown). Connected to the pressure chambers 90, 80 of the master brake cylinder 13 are a first and a second brake circuit 16 and 17 by way of relief chambers 123, 133, 124, 134 of two compensating cylinders 120, 130 which are arranged in parallel to the master brake cylinder 13.

By way of two solenoid valves 18, 19, arranged as two-way/two-position directional control valves, the first brake circuit 16 connects the wheel brake cylinders of the two wheel brakes 20 and 21, respectively, which are shown schematically, with the master brake cylinder 13. Each of the two solenoid valves 18, 19 is allocated to one of the two front-wheel brakes 20 and/or 21. The second brake circuit 17 connects the wheel brake cylinder of the other two wheel brakes 22, 23, which are likewise shown schematically, with the master brake cylinder 13 by way of a two-way/two-position directional control valves. Preferably, the master brake cylinder 13 is designed as a conventional tandem master cylinder.

Associated with each of the front-wheel and rear-wheel brakes 20, 21, 22 and 23 is one sensor 25, 26, 27, 28, respectively, which are connected with a central control electronics 33 by way of corresponding signal lines 29, 30, 31 and 32, respectively. The sensors 25, 26, 27 and 28, which can be designed as inductive transducers, for example, monitor the wheel rotational behavior and supply corresponding signals by way of the signal lines 29, 30, 31 and 32, respectively, to the control electronics 33. The control electronics 33 is connected by way of control lines 34, 35, 36 with the solenoid valves 18, 19 and 24, respectively, in order to actuate these as a function of the sensor signals.

At first pneumatic working chamber 37 of the vacuum brake power booster 10 is permanently connected to the atmosphere, while its second pneumatic working chamber 45 communicates with a vacuum source 42 by way of a vacuum line 38, a change-over solenoid valve 39, a vacuum accumulator 40 and a non-return valve 41. The changer-over solenoid valve 39 is arranged as a three-way/two-position directional control valve which, in its first position, when it is de-energized, connects the vacuum line 38 with the vacuum accumulator 40 and the vacuum source 42, respectively. In its second position, the change-over solenoid valve 39, when it is energized, closes the passage to the vacuum source 42 and, simultaneously, connects the vacuum line 38 with an atmosphere port 43. In order to actuate the change-over solenoid valve 39 by virtue of the central control electronics 33, there is provision for a control line 44 leading from the control electronics 33 to the change-over solenoid valve 39. A vacuum chamber 5 of the vacuum brake power booster 10 communicates by way of a vacuum line 46 and a non-return valve 47 directly to the vacuum source 42.

Figure 2:
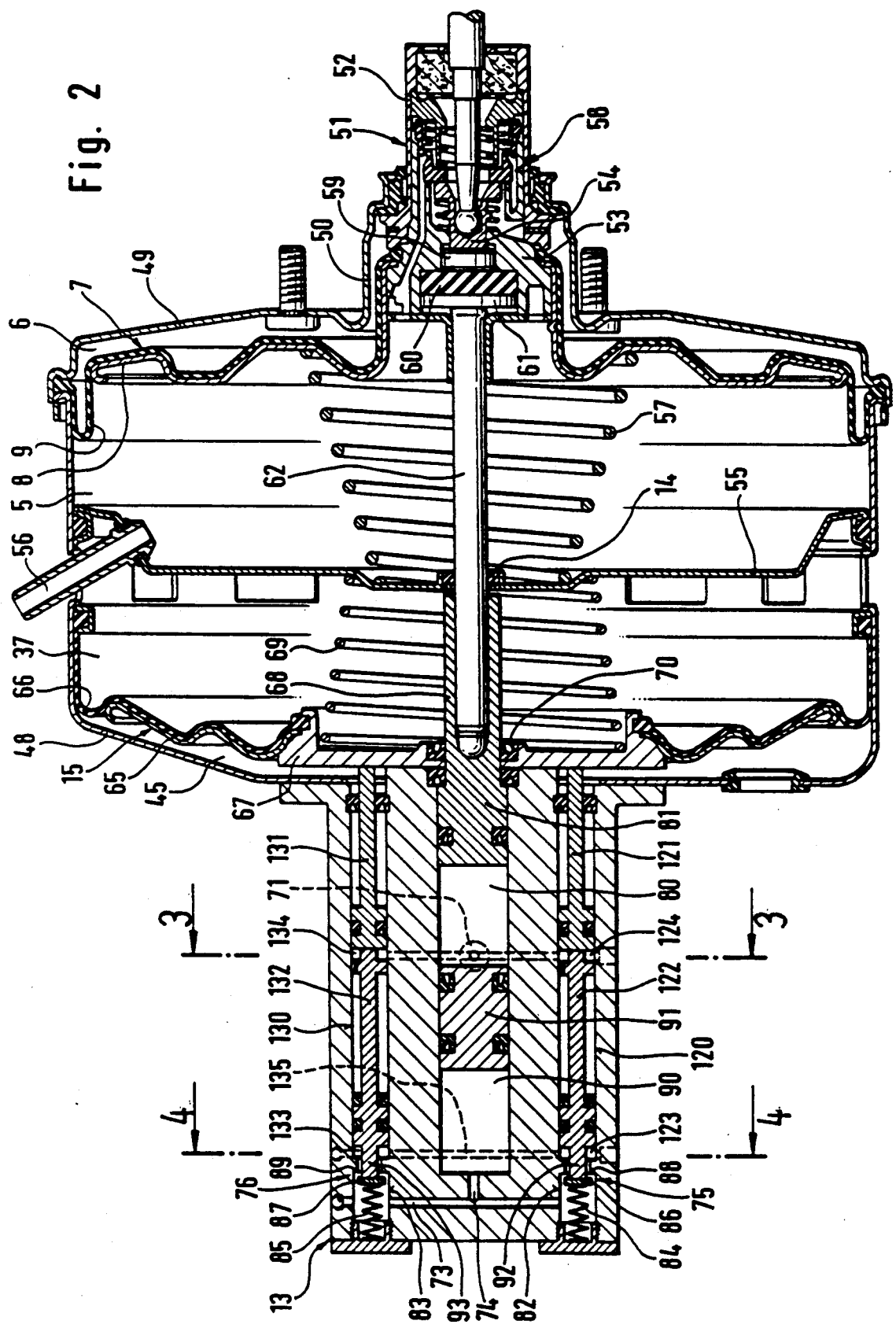
FIG. 2 is a cross-section taken through an embodiment of the assembly group including a vacuum brake power booster and a master brake cylinder.

According to FIG. 2, the vacuum brake power booster 10 is composed of two wheel-shaped housing parts 48, 49 assembled with their open sides. The housing part 48 which is illustrated at the left-hand side in FIG. 2 is rigidly coupled to the tandem master brake cylinder 13, while the right-hand housing part 49 comprises a central guide socket 50 which holds a control valve housing 51 of the vacuum brake power booster 10 in a slidingly and vacuum-tight guided manner. The control valve housing 51 includes a rear control housing part 52 which extends out of the vacuum brake power booster 10 in the direction of the brake pedal 12, as well as a front control housing part 53 which is substantially arranged within the brake power booster 10.

A partition wall 55 with ring seal 14 disposed between the two housing parts 48, 49, separates the first pneumatic working chamber 37 from the vacuum chamber 5 which is connectable to the vacuum source 42 by way of a vacuum port 56. In turn, the vacuum chamber 5 is isolated from a working chamber 6 by means of a movable wall 7 consisting of a diaphragm plate 8 and a rolling diaphragm 9 abutting thereon. The working chamber 6 is adapted to be ventilated by means of a valve assembly 58 arranged in the control valve housing 51. The valve assembly 58 which is of conventional construction is actuated by a valve piston 54 which is coupled to the piston rod 11 and which transmits the actuating force introduced by way of the brake pedal 12 by way of a transmission disc 59, a rubber-elastic reaction disc 60 and a pressure plate 61 onto a force-output member or push rod 62. To reset the movable wall 7, there is provision for a resetting spring 57 which is clamped in between the partition wall 55 and the diaphragm plate 8.

The two pneumatic working chambers 37, 45 which are preferably arranged in the front housing part 48 are isolated from each other by means of a second movable wall 15 formed by a second diaphragm plate 65, on which a second rolling diaphragm 66 is abutting whose outer periphery is secured to the housing part 48 and whose inner periphery is fixed together with the second diaphragm plate 65 to a guide ring 67. Guide ring 67 which is slidably guided on an axial extension 68 extending up to the partition wall 55 simultaneously forms an abutment surface for a compression spring 69 bearing against the partition wall 55 and biassing the second diaphragm plate 65 in the inactive position in the direction of the front housing part 48. A ring seal 70 serves to seal the guide ring 67 relative to the axial extension 68.

Figure 3:
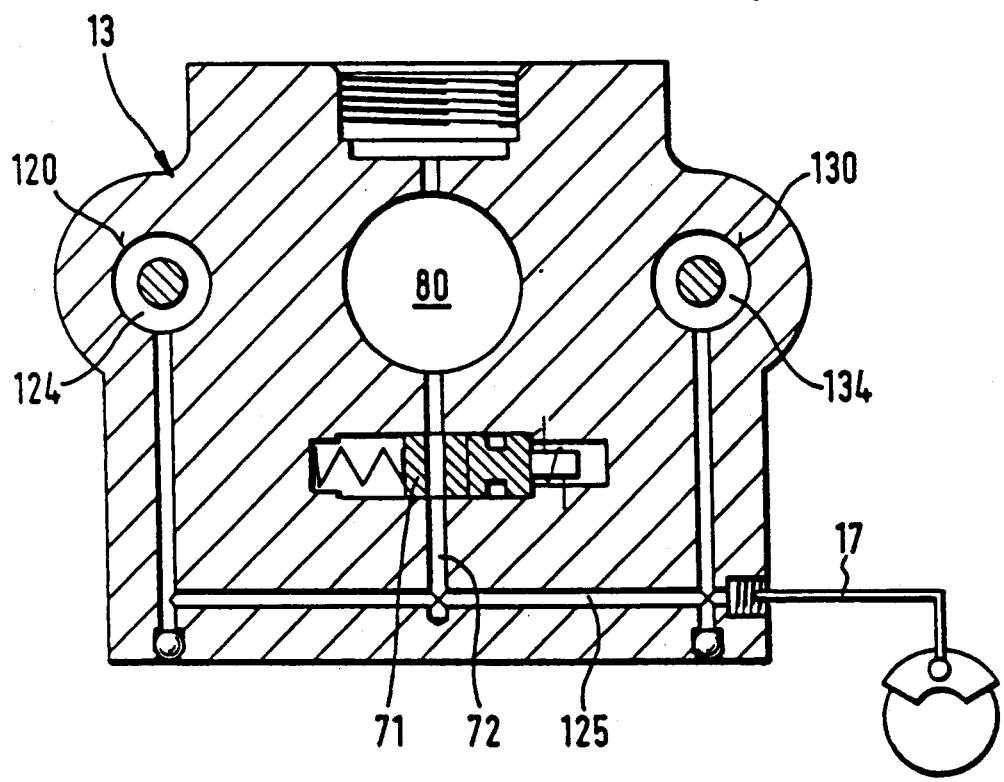
FIG. 3 is an enlarged cross-sectional view of a detail of the master brake cylinder according to FIG. 2; and, FIG. 4 is an enlarged cross-sectional view of a second detail of the master brake cylinder according to FIG. 2.
Figure 4:
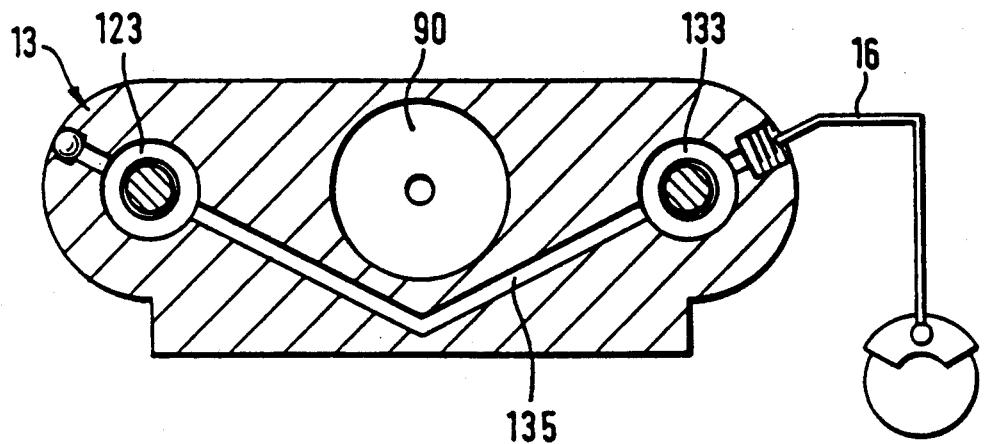

In order to quickly decrease the hydraulic pressure prevailing in the master-brake-cylinder pressure chambers 80, 90, in the event of a slip control action, the two compensating cylinders 120, 130 described with reference to FIG. 1 are provided with relief pistons 121, 122, 131, 132 displaceably guided therein which, preferably, are integrated in the housing of the master brake cylinder 13 arranged in parallel to one another. These relief pistons 121, 122, 131, 132 confine in the compensating cylinders 120, 130 relief chambers 123, 124, 133, 134 which, by means of connecting ducts 125, 72, 135, 73, 74 (FIGS. 2, 3, 4) are interconnected and are connected with the individual pressure chambers 80, 90 of the master brake cylinder 13. The connecting duct 72 connecting the relief chambers 124, 134 with the primary pressure chamber 80 of the master brake cylinder 13 is closable by way of an electromagnetically actuatable two-way/two-position directional control valve 71 which can be driven by control signals of the central control electronics 33 by way of a control line 63. The hydraulic connection between the two relief chambers 123, 133 and the secondary pressure chamber 90 of the tandem master brake cylinder 13 by way of the connecting ducts 73 and 74 can be closed or opened, respectively, by means of two seat valves 75, 76 which are drivable mechanically by the relief pistons 122, 132 and which are arranged in bores 82, 83 designed coaxially to the relief chambers 129, 133 in the housing of the master brake cylinder 13. The seat valves 75, 76 each are composed of one closure member 86, 87 preferably a closing plate and/or ball, which coacts with each one sealing seat 88, 89 that is designed at the transition from the relief chamber 123, 133, allocated to the secondary pressure chamber 90, to the bore 82, 83 and is preloaded in the closing direction each by means of one compression spring 84, 85. The actuation of the seat valves 75, 76 is effected by axial extensions 92, 93 of the relief pistons 122, 132, the positioning of the connecting ducts 73, 74 and bores 82, 83 being preferably chosen such that the closure members 86, 87 can be acted upon in the closing direction by the pressure prevailing in the secondary pressure chamber 90 of the tandem master cylinder 133.

The mode of function of the inventive automotive vehicle brake system shown in the drawing will be described in the following: When the brakes are released, that is in the non-actuated condition of the vacuum brake power booster 10, the three working chambers 5, 6, 45 are evacuated, while atmospheric pressure prevails in the first working chamber 37. The compression spring 69 preloads the second diaphragm plate 65 so that it moves to abut on the relief pistons 121, 131. The pressure-fluid connections 125, 72 and 73, 74, 82, 83, 88, 89 between the primary and the secondary pressure chamber 80 and 90 and the relief chambers 123, 133, 124, 134 are open.

When the brake pedal 12 is depressed on braking, the effect of force causes the piston rod 11 with the valve piston 54 to displace to the left, the valve assembly 58 being actuated as a result. As a result thereof, a pressure differential proportional to pedal force is introduced at the movable wall 7 and generates a boosting force which adds to the pedal force and is transmitted by way of the push rod 62 onto the primary piston 81 of the master brake cylinder 13 in order to build up a hydraulic pressure in the two pressure chambers 80 and 90 which is supplied to the individual wheel brakes 20, 21, 22 and 23 by way of the brake circuits 16 and 17. Application and release of the brakes thus functions in a known vacuum brake power booster manner.

Should any one or more of the sensors 25, 26, 27, 28 detect locking of the associated wheel during a braking action and signal this fact to the central control electronics 33, the latter generates switch-over signals which cause simultaneous switch-over of the valves 39, 71. The pressure prevailing in the relief chambers 123, 133 and 124, 134, respectively, or in the wheel cylinders causes the second movable wall 15 to displace against the actuating direction so that the previously described hydraulic pressure can be discharged, while the connection between the primary pressure chamber 80 and its associated relief chambers 124, 134 is interrupted by change-over of the two-way/two-position directional control valve 71. Simultaneously, the connection 73, 74 between the secondary pressure chamber 90 and its associated relief chambers 123, 133 is also closed by closing of the seat valves 75, 76 which are now unloaded mechanically. The result is that the pedal force of the driver as well as the boosting force of the first movable wall 7 are effectively held back.

In case higher pressure is needed on the wheel brakes, the second pneumatic working chamber 45 is evacuated by switch-over of the change-over solenoid valve 39 (FIG. 1). The boosting force which is generated by the pressure differential acting on the second diaphragm plate 65 builds up higher pressure in the compensating cylinders 120 and 130 and thus in the wheel brake cylinders, which pressure may rise maximally to the extent that it corresponds to the pressure introduced by pedal force. To modulate the pressure in the brake circuits 16, 17, alternatingly vacuum and atmosphere, respectively, is applied to the second pneumatic working chamber 45 by way of the change-over solenoid valve 39.

When the anti-lock control action is terminated, the second pneumatic working chamber 45 will be fully evacuated and the valves 71, 75, 76 are switched back. Thus, the system will re-assume the condition it had before the control action. Then, the braking operation can be continued normally or discontinued by removing the pedal force.

The braking operation can also be terminated by the driver during an anti-lock control action be removing the pedal force. In this event, the relief pistons 121, 122, 131, 132 and the second diaphragm plate 65 will return unpressurized into their initial positions.

What is claimed is:

1. An automotive vehicle brake system having a vacuum brake power booster which is interposed between brake pedal and master brake cylinder and which comprises at least two working chambers isolated from one another by by a diaphragm plate, one of said chambers communicating with a vacuum source, while the other one of said chambers is ventilated by means including a control valve actuated by the brake pedal for generating a boosting force that is proportional to the brake pedal force, wherein wheel brake cylinders are connected by way of brake lines to the master brake cylinder, wherein sensors are allocated to the wheels to be braked which sense the rotational behavior of the wheels to determine wheel-lock, and the output signals of which sensors are coupled to a central control electronics, and with a second diaphragm plate provided in the vacuum brake power booster to which a controllable pressure difference is applied and which isolates two additional pneumatic working chambers from each other and which, for slip control, is movable in a direction opposite to the actuating direction of the master brake cylinder under the effect of two compensating cylinders (120, 130) connected to and cooperating with the master-brake-cylinder pressure chambers, wherein said compensating cylinders (120, 130) include relief chambers (123, 133, 124, 134) respectively connected to pressure chambers (80, 90) of said master cylinder, and wherein the wheel brake cylinders are further connected to said relief chambers (123, 133, 124, 134) of the compensating cylinders (120, 130) and the connection between the master-brake-cylinder pressure chambers (80, 90) and the relief chambers (123, 133, 124, 134) being closable during said slip control.

2. An automotive vehicle brake system as claimed in claim 1, wherein the connection between the first master-brake-cylinder pressure chamber (80) and its associated relief chambers (124, 134) is closable by means of an electromagnetically actuatable valve (71) which is controllable by the central control electronics (33).

3. An automotive vehicle brake system as claimed in claim 1, wherein the connection between the second master-brake-cylinder pressure chamber (90) and each associated relief chambers (123, 133) respectively, is closable by means of one seat valve (75, 76) actuatable mechanically by each one relief piston (122, 132).

4. An automotive vehicle brake system as claimed in claim 3, wherein the seat valves (75, 76) are arranged in bores (82, 83) which bores are arranged coaxially relative to the relief chambers (123, 124, 133, 134).

5. An automotive vehicle brake system as claimed in claim 4, wherein the seat valves (75, 76) are each formed by one closure member (86, 87) comprising a closure plate or a ball, each of which is respectively preloaded by means of one compression spring (84, 85), which respectively coacts with each sealing seat (88, 89) that is arranged at the transition from the relief chamber (123, 133), allocated to the secondary pressure chamber (90) to the bore (82, 83).

6. An automotive vehicle brake system as claimed in claim 5, wherein during slip control, the closure members (86, 87) of the seat valves (75, 76) are acted upon by the pressure prevailing in the secondary pressure chamber (90) of the tandem master cylinder (13).

* * * * *